(12) United States Patent
Andruzzi et al.

(10) Patent No.: US 7,855,864 B2
(45) Date of Patent: Dec. 21, 2010

(54) SWITCHED MODE POWER SUPPLY METHOD AND APPARATUS

(75) Inventors: Joseph Michael Andruzzi, Raleigh, NC (US); Daragh Padraic MacGabhann, Raleigh, NC (US); Brian Ashley Carpenter, Cary, NC (US)

(73) Assignee: Semtech Corporation, Morrisville, NC (US)

( * ) Notice: Subject to any disclaimer, the term of this patent is extended or adjusted under 35 U.S.C. 154(b) by 580 days.

(21) Appl. No.: 11/387,943

(22) Filed: Mar. 23, 2006

(65) Prior Publication Data

US 2006/0220623 A1 Oct. 5, 2006

Related U.S. Application Data

(60) Provisional application No. 60/667,010, filed on Mar. 31, 2005.

(51) Int. Cl.
*H02H 3/20* (2006.01)
*G05F 3/02* (2006.01)

(52) U.S. Cl. ...................................... 361/91.1; 323/224
(58) Field of Classification Search ................ 361/91.1; 323/224
See application file for complete search history.

(56) References Cited

U.S. PATENT DOCUMENTS 5,066,869 A * 11/1991 Neidorff ..................... 327/143
5,481,178 A * 1/1996 Wilcox et al. ............... 323/287
5,912,552 A * 6/1999 Tateishi ...................... 323/285
6,088,244 A * 7/2000 Shioya et al. ............. 363/21.07
6,215,288 B1 * 4/2001 Ramsey et al. .............. 323/224
6,310,469 B1 * 10/2001 Bentolila et al. ............ 323/283
6,310,556 B1 * 10/2001 Green et al. ............ 340/636.15
6,922,041 B2 * 7/2005 Goder et al. ................. 323/275
2003/0231012 A1 * 12/2003 Corva et al. ................. 323/285
2004/0090218 A1 * 5/2004 Isham ......................... 323/282

* cited by examiner

*Primary Examiner*—Jared J Fureman
*Assistant Examiner*—Nicholas Ieva
(74) *Attorney, Agent, or Firm*—Coats & Bennett, P.L.L.C.

(57) ABSTRACT

In one or more embodiments, a switched mode power supply circuit is configured to monitor and control its output voltage during discontinuous conduction mode (DCM) operation, to prevent output over-voltage conditions. For example, in one embodiment, a switched mode power supply circuit is configured to operate selectively in continuous conduction mode (CCM) and discontinuous conduction mode (DCM), and it includes a control circuit that is configured to detect an output over-voltage condition during DCM operation. The control circuit reduces the output voltage of the switched mode power supply circuit responsive to detecting the output over-voltage condition, such as by activating a pull-down device and/or temporarily reverting the switched mode power supply circuit to continuous conduction mode (CCM) operation.

8 Claims, 7 Drawing Sheets

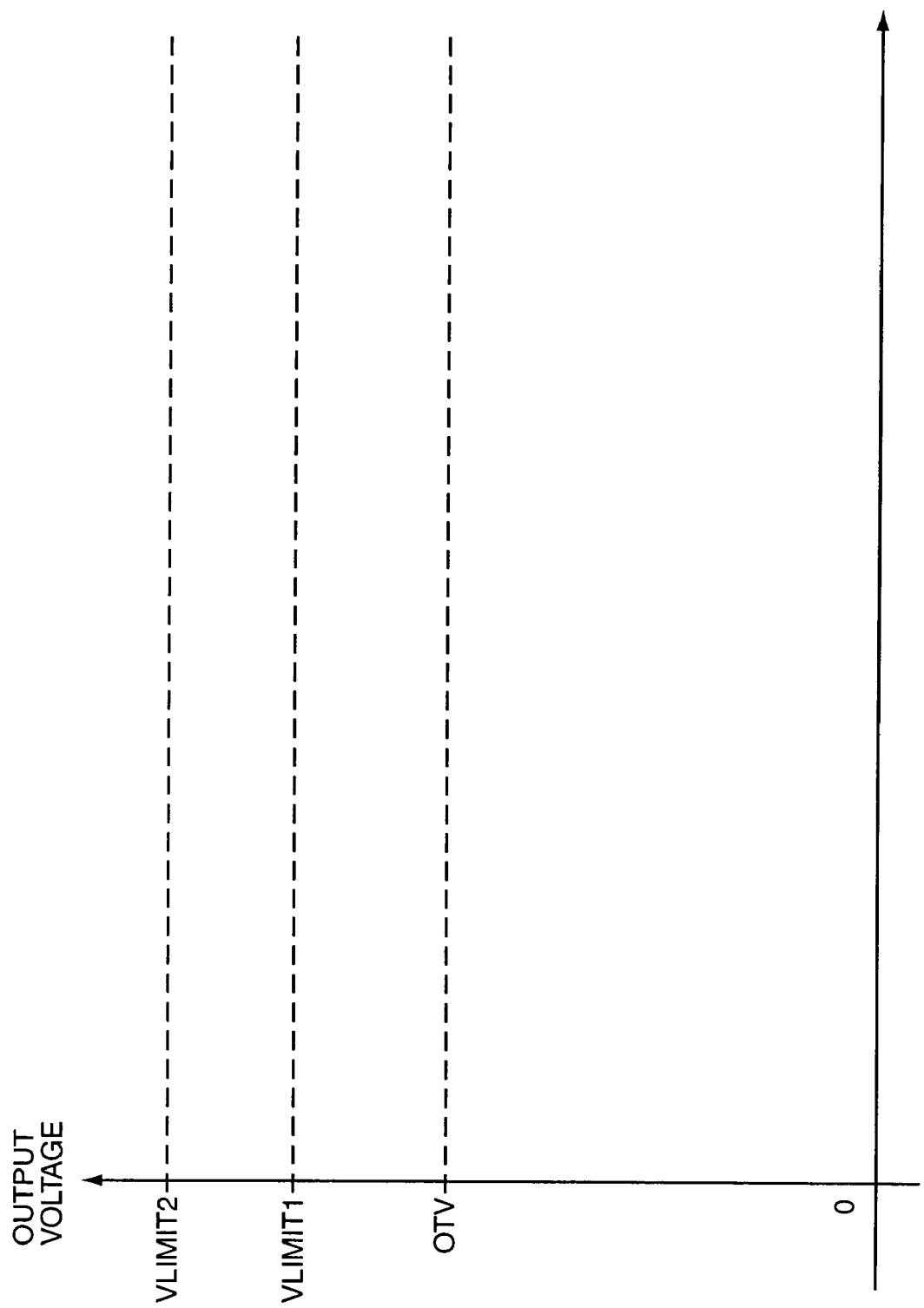

SWITCHED MODE POWER SUPPLY METHOD AND APPARATUS

RELATED APPLICATIONS

This application claims priority under 35 U.S.C. §119(e) from the provisional patent application entitled "Smart Power Save In a Switched Mode Power Supply," which was filed on 31 Mar. 2005 and is identified by Ser. No. 60/667,010, and which is incorporated in its entirety by reference herein.

BACKGROUND

The present invention generally relates to power supplies, and particularly relates to switched mode power supplies.

Numerous mechanisms exist for implementing switched mode power supplies (SMPSs). The use of a switched inductor output circuit stands as a non-limiting example of one common implementation. In switched inductor topologies, the SMPS actively regulates its output voltage by switching the output inductor into and out of electrical connection with a supply voltage according to some form of regulation error feedback signal or other regulation control signal. Active regulation sometimes is referred to as "continuous conduction mode" (CCM) operation, denoting the ongoing high/low switching of the output inductor.

More sophisticated SMPSs improve their overall operating efficiencies by operating in "discontinuous conduction mode" (DCM) under certain load conditions. For example, a given SMPS may be configured to enter DCM responsive to detecting zero or negative load current conditions. In other words, when the load current drawn from the SMPS by its load falls to zero, or becomes negative, the SMPS improves its overall operating efficiency by suspending its active regulation switching operations, i.e., it turns its switched output off and allows the load to "float."

While DCM improves efficiency, its advantages come at the expense of potential problems. For example, the typical SMPS does not provide a sink for negative load current while operating in DCM, so the load voltage may float to undesirably high levels. High float voltages risk damaging the load or the SMPS. Alternatively, if the SMPS does provide a current sink for negative load current during DCM, the amount of current sunk by the SMPS may rise to undesirably high levels.

SUMMARY

In one or more embodiments, a switched mode power supply circuit is configured to monitor and control its output voltage during discontinuous conduction mode (DCM) operation, to prevent output over-voltage conditions. For example, in one embodiment, a switched mode power supply circuit is configured to operate selectively in continuous conduction mode (CCM) and discontinuous conduction mode (DCM), and includes a control circuit that is configured to detect an output over-voltage condition during DCM operation. The control circuit reduces the output voltage of the switched mode power supply circuit responsive to detecting the output over-voltage condition.

In one or more embodiments, the control circuit is configured to reduce the output voltage by temporarily reverting the switched mode power supply circuit to CCM operation—i.e., the switched mode power supply circuit returns to active regulation of the output voltage relative to an operating target voltage. The control circuit may be further configured to return the switched mode power supply circuit to DCM operation based on monitoring inductor current in a switching circuit driven by the switched mode power supply circuit during CCM operation. That is, the control circuit reverts the switched mode power supply circuit to CCM operation to relieve the over-voltage condition, and then returns it to DCM operation when the inductor current goes to zero or becomes negative. The return to DCM operation may be qualified, such as by the control circuit being configured to count inductor current zero crossings, or requiring the zero/negative current condition to persist for a given period of time.

The duration of CCM operation needed to bring the output voltage back into a desired range may be quite brief. For example, in one embodiment, the control circuit is configured to pull down the output voltage by activating a low side switch in the switching circuit driven by the switched mode power supply circuit during CCM operation. In other embodiments, the switched mode power supply circuit may include a dedicated pull-down device that can be temporarily activated as needed during DCM operation, such as in response to detecting that the output voltage rises to a defined voltage limit. The switched mode power supply circuit also may be configured to activate an external pull down (shunt) device responsive to detecting that the output voltage has reached a defined limit.

In one or more embodiments, the switched mode power supply circuit is configured to monitor its output voltage relative to more than one voltage limit during DCM operation. By way of non-limiting example, the switched mode power supply circuit monitors its output voltage during DCM operation relative to first and second limits. If the output voltage reaches the first limit, the switched mode power supply circuit takes action to reduce the output voltage, such as by temporarily reverting to CCM operation and/or activating a pull-down device. If the output voltage reaches the second limit, which is higher than the first limit, the switched mode power supply circuit generates a fault signal, which it may latch, and/or may initiate circuit shut down.

Of course, the present invention is not limited to the above features and advantages. Indeed, those skilled in the art will recognize additional features and advantages upon reading the following disclosure and upon viewing the accompanying drawings.

BRIEF DESCRIPTION OF THE DRAWINGS

FIG. 2 is a graph of one embodiment of output voltage detection limits to be monitored during discontinuous mode operation of a switched mode power supply circuit.

DETAILED DESCRIPTION

Figure 1:
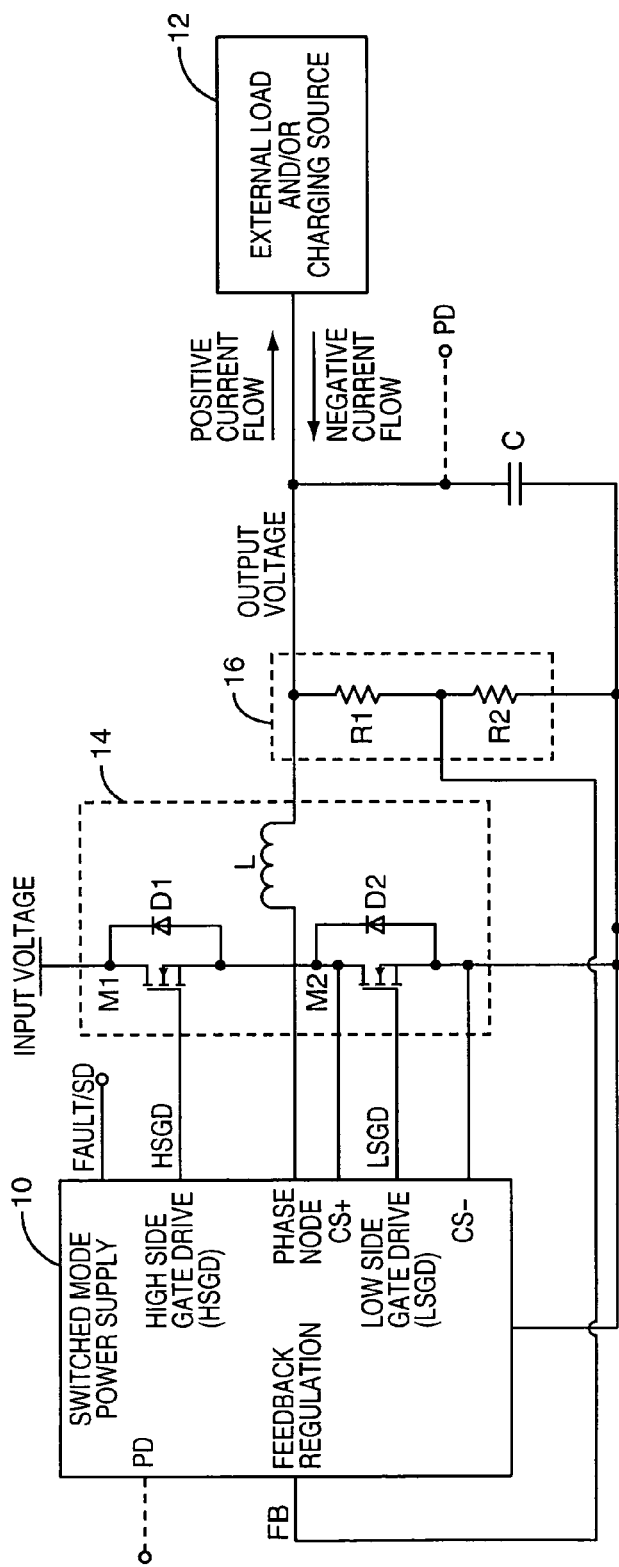
FIG. 1 is a block diagram of one embodiment of a switched mode power supply circuit and load.

FIG. 1 illustrates a switched mode power supply (SMPS) circuit 10 that is configured to provide power to an external load 12 at a regulated output voltage. To that end, the SMPS circuit 10 controls an (inductive) switching circuit 14 that comprises transistor switches M1 and M2, diodes D1 and D2, which may be integral with M1 and M2, and a switched inductor L. A feedback circuit 16 provides regulation control feedback for the SMPS circuit 10 and, in the illustrated embodiment, comprises a voltage divider formed by resistors R1 and R2. The center tap of the voltage divider provides a feedback signal (FB) to a regulation feedback input of the SMPS circuit 10.

The SMPS 10 selectively operates in Continuous Conduction Mode (CCM), wherein it drives the switching circuit 14 to maintain the output voltage at an operating target voltage, or in Discontinuous Conduction Mode (DCM), wherein it generally suspends operation of the switching circuit 14. DCM mode offers power savings and may be used, for example, at times when the current into the load 12 is zero or negative. However, as taught herein, the SMPS circuit 10 prevents output voltage problems, such as potentially damaging over-voltage conditions, while operating in DCM. Thus, in one sense, the SMPS circuit 10 continues "regulating" the output voltage in DCM, inasmuch as it takes action to prevent the output voltage from going above (or below) one or more defined thresholds.

The SMPS circuit 10 prevents output voltage problems during DCM operation by detecting an output over-voltage condition during DCM operation, and reducing an output voltage of the SMPS circuit 10 responsive to detecting the output over-voltage condition. In one embodiment, reducing the output over-voltage condition comprises temporarily reverting the SMPS circuit 10 to CCM operation.

In such embodiments, the SMPS circuit 10 may be configured to return the SMPS circuit 10 to DCM operation based on monitoring inductor current in the switching circuit 14, i.e., monitor current in the switching circuit inductor L, which is driven by the SMPS circuit 10 during CCM operation. For example, the SMPS circuit 10 returns to DCM operation responsive to detecting that the L inductor current goes to zero and/or becomes negative. As will be detailed later herein, current-monitoring based return to DCM operation may be qualified, such as by counting inductor current zero crossings, or by requiring that it remain zero or negative for a given length of time before DCM operation is resumed.

Reverting from DCM operation to CCM operation to relieve output over-voltage conditions arising during DCM operation results in activation of the low-side switch (M2) in the switching circuit 14. Indeed, rather than switching the high-side/low-side transistors M1 and M2 on and off for full CCM regulation, the SMPS circuit 10 is configured in one or more embodiments to reduce the output voltage during DCM operation by activating a pull-down device. That device may be the low-side transistor M2, which is already available for such use. Optionally, as shown in FIG. 1, the SMPS circuit 10 may include a pull-down device coupled to the output voltage node (denoted as PD signal). Of course, a pull-down device external to the SMPS circuit 10 also may be used by the SMPS circuit 10 to control the output voltage during DCM operation. However, implemented, it should be understood that a shunt switch of some type can be driven by the SMPS circuit 10 during DCM operation to prevent output over-voltage conditions.

Regarding output voltage control, FIG. 2 illustrates an embodiment of the SMPS circuit 10 that is configured to monitor the output voltage relative to two or more voltage limits, which may be predefined limits, or dynamically adjusted limits. Regardless, one sees in FIG. 2 an "OTV" line corresponding to the operating target voltage level, and a first voltage limit identified as "VLIMIT1," and a second, higher voltage limit identified as "VLIMIT2." During CCM operation, the SMPS circuit 10 drives the switching circuit 14 to maintain the output voltage at or about the OTV target, over dynamically changing load current conditions.

During DCM operation, the SMPS circuit 10 monitors the output voltage via the feedback circuit 16, which provides a scaled voltage proportional to the output voltage. In one embodiment of DCM operation, if the output voltage reaches the first voltage limit (VLIMIT1), the SMPS circuit 10 operates to reduce the output voltage—i.e., it reverts to CCM operation or otherwise activates a pull-down device coupled to the output voltage node. Further, if the output voltage reaches the second voltage limit (VLIMIT2), the SMPS circuit 10 generates a fault signal, which it may latch for use by a higher-level supervisory circuit, and/or initiates circuit shut down. Of course, the SMPS circuit 10 may use a single monitoring threshold to trigger its output voltage reduction actions.

Figure 3:
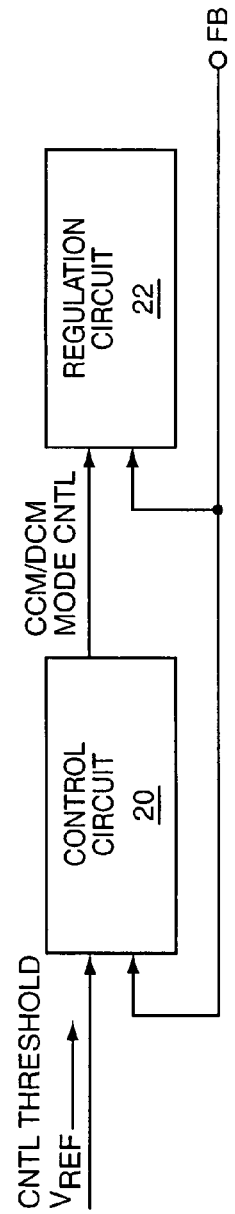
FIG. 3 is a block diagram of one embodiment of a switched mode power supply circuit.

As illustrated in FIG. 3, one embodiment of the SMPS circuit 10 includes a control circuit 20 and a regulation circuit 22. For purposes of this discussion, the regulation circuit 22 comprises the general collection of operational circuits included in the SMPS circuit 10, and thus provides for the output voltage regulation during CCM operation of the SMPS circuit 10. Of more interest, the control circuit 20 is configured to monitor the output voltage during DCM operation and reduce that voltage responsive to detecting that it has reached a defined voltage threshold.

In one embodiment, the control circuit 20 monitors the output voltage feedback signal from the feedback circuit 16 in FIG. 1 during DCM operation and may use one or more control threshold signals—e.g., reference voltages—for determining whether the output voltage is within limits. If the output voltage gets too high during DCM operation—i.e., violates the defined voltage threshold(s)—the control circuit 20 takes action to reduce the output voltage. As detailed earlier herein, the control circuit 20 brings the output voltage back below the defined limit by temporarily reverting the regulation circuit 22 to CCM operation, or otherwise acts to reduce the output voltage by activating a pull-down device, such as a shunt switch coupled to the output voltage node.

Figure 4:
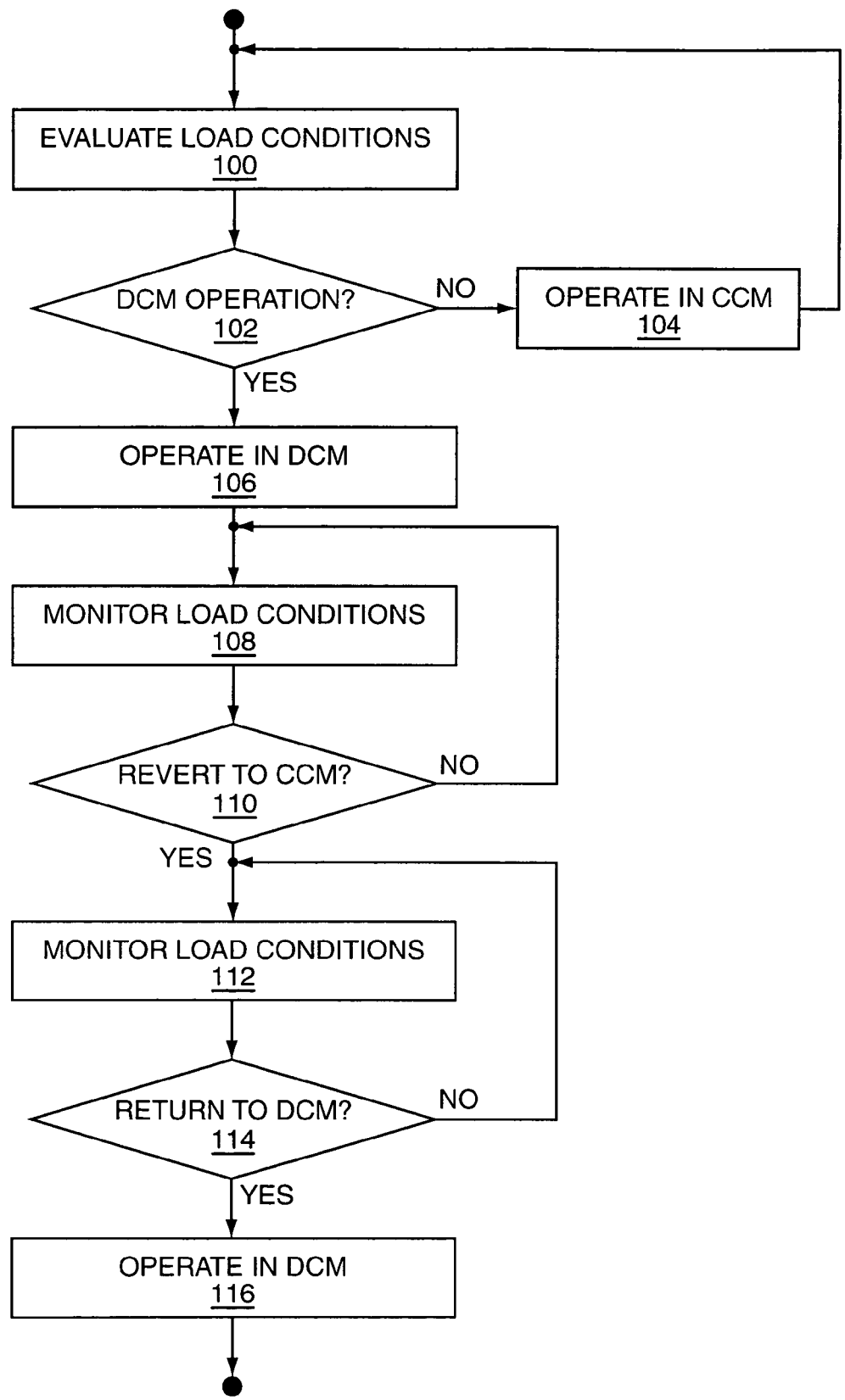
FIG. 4 is a logic flow diagram of one embodiment of a method of switched mode power supply circuit operation.

As illustrated in FIG. 4, operation of the control circuit 20 therefore complements operation of the regulation circuit 22. More particularly, FIG. 4 illustrates a method of SMPS circuit control which may be embodied via processing logic included in the SMPS circuit 10. (Such logic may comprise hardware-based processing logic, software/firmware based processing logic, or any combination thereof.)

The illustrated processing may be understood as representing ongoing control processing, but for purposes of discussion processing "begins" with the evaluation of load conditions (Step 100). Assuming that the SMPS circuit 10 is currently operating in CCM, the evaluation comprises the control circuit 20 and/or the regulation circuit 22 determining whether the switching inductor current is positive, negative, or zero. For example, see the CS+ and CS− connections illustrated for the SMPS circuit 10 in FIG. 1 allow the SMPS circuit 10 indirectly to evaluate inductor load current via the low-side switch M2.

The decision (Step 102) to transition from CCM operation to DCM operation may be based on determining whether the L inductor current is positive or negative (or zero). If the L inductor current is positive, the SMPS circuit 10 continues operating in CCM (Step 104) and processing returns to Step 100. However, if the inductor current is zero or negative, the SMPS circuit 10 transitions into DCM operation (Step 106). In one embodiment, the regulation circuit 22 is configured to perform the CCM-to-DCM evaluation.

Now operating in DCM, the SMPC circuit 10 monitors load conditions, e.g., monitors the output voltage (Step 108). Based on such monitoring, the control circuit 20 determines whether DCM operation should continue (Step 110). If the output voltage remains within defined limits, operation continues in DCM and processing returns to Step 108 for continued monitoring.

Conversely, if the output voltage has reached a defined voltage threshold, which is generally defined to be some distance above the nominal operating voltage target, the control circuit 20 reverts the regulation circuit 22 to CCM operation and monitors load conditions (Step 112). Such monitoring may comprise, as explained earlier herein, monitoring inductor current as a means for evaluating whether return to DCM operation is permissible (Step 114). If such a return is not permissible, processing returns to Step 112 for continued evaluation, or, if such a return is permissible—e.g., zero or negative inductor current—the SMPS circuit 10 returns to DCM operation (Step 116). As such, the processing logic illustrates SMPS circuit operation wherein the SMPC circuit 10 seamlessly transitions from CCM operation to DCM operation to save power/increase operation efficiency when load conditions permit, and (temporarily) returns to CCM operation as needed to relieve output over-voltage conditions.

Figure 5:
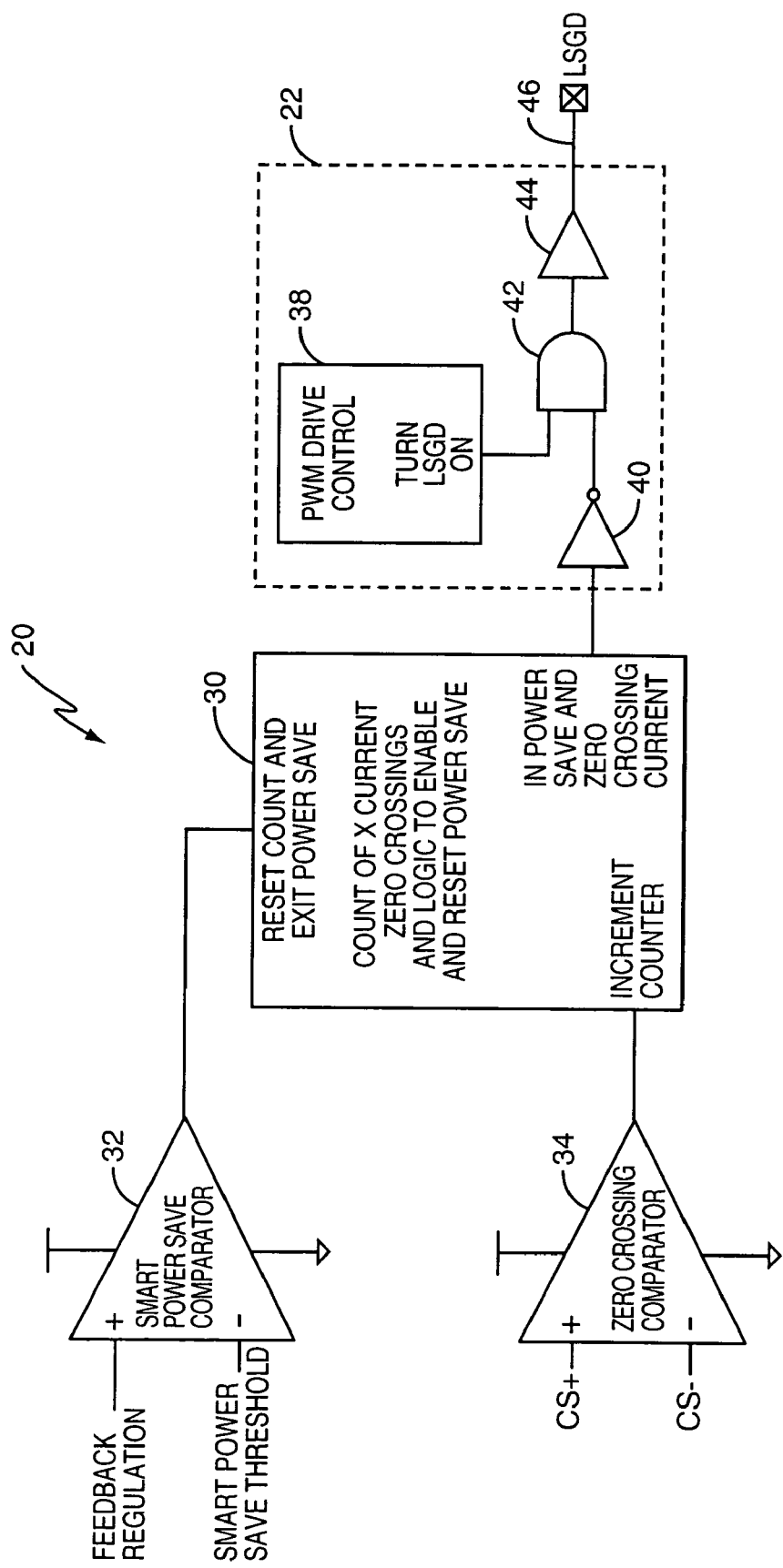
FIG. 5 is a block diagram of one embodiment of a mode control circuit for use in a switched mode power supply circuit.

As for relieving output over-voltage conditions, FIG. 5 illustrates one embodiment of the control circuit 20 which is operative to reduce the output voltage during DCM operation. The control circuit 20 may be configured to reduce excessive output voltage during DCM operation of the regulation circuit 22 by reverting the regulation circuit 22 to CCM operation, or by trigging the regulation circuit 22 to activate the low-side switch M2 of the switching circuit 14. For example, the control circuit 20 may cause the regulation circuit 22 to pulse the transistor M2 one or more times, as needed to bring the output voltage back within allowable limits during DCM operation.

The illustrated control circuit 20 comprises a mode control circuit 30, an (output) voltage monitoring circuit 32, and an (inductor) current monitoring circuit 34. The control circuit 20 is, via the mode control circuit 30, configured to revert the SMPS circuit 10 to CCM operation responsive to the voltage monitoring circuit 32, and return the SMPS circuit 10 to DCM operation responsive to the current monitoring circuit 34.

In more detail, the regulation circuit 22 enters DCM operation, such as by the mechanism discussed in the context of FIG. 4, and the mode control circuit 30 begins monitoring the output voltage via the voltage monitoring circuit 32. The voltage monitoring circuit 32 compares the feedback regulation signal from the feedback circuit 16 to a defined voltage level, which may be understood as representing the output voltage limit for remaining in DCM and thus may be referred to as a "smart power saving" threshold. (Note that additional voltage monitoring circuits 32 may be included in the control circuit 20 to monitor multiple output voltage thresholds, or may be implemented as a windowed comparator to perform that function.)

If the voltage monitoring circuit 32 asserts its output responsive to the feedback signal exceeding the reference threshold, the mode control circuit 30 resets an internal count and initiates the regulation circuit's reversion to CCM operation. For example, the illustrated embodiment of the regulation circuit 22 comprises a Pulse Width Modulation (PWM) drive control circuit 38, which drives the switching circuit 14 during CCM operation to effect output voltage regulation. The illustrated regulation circuit 22 further comprises an input gate 40 coupled to the mode control circuit 30. The output of that gate drives an AND gate 42, which allows the PWM gate drive from the PWM drive control circuit 38 to propagate to an output driver 44, whose output signal (LSGD) at output 46 drives the low-side transistor M2 in the switching circuit 14. Such action begins switched operation of the M2 transistor, and thereby reduces the output voltage.

The above circuit arrangement thus provides a method and apparatus to respond to zero or negative load current while in DCM operation that provides for sustained DCM operation with a minimal increase in output ripple voltage. That is, as the output voltage rises during DCM operation because of negative current, the SMPS circuit 10 senses the rising voltage condition by detecting when the output voltage feedback signal crosses a comparison threshold, and reverting to CCM operation in response to that event. After reverting to CCM operation, the current monitoring circuit 34, which may be driven by the CS+ and CS− connections shown in FIG. 1, counts zero crossings of the L inductor current, $I_L$ (t). One or more zero crossing events can be used as a trigger for returning to DCM operation.

Figure 6:
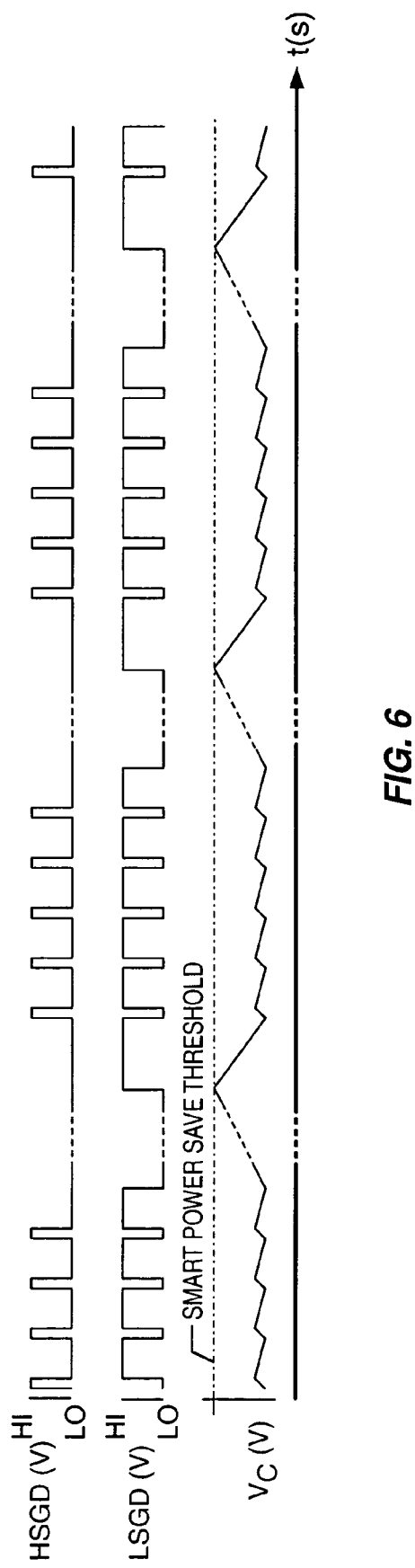
FIGS. 6-8 are graphs of selected signal waveforms relevant to one or more embodiments of switched mode power supply circuit operation.

For example, FIG. 6 illustrates signal waveforms corresponding to DCM-to-CCM-to-DCM transitions for the SMPS circuit 10 during zero or negative load current conditions. In the waveform graphs, one sees examples for the high-side gate drive (HSGD) signal generated by the SMPS circuit 10 for the high-side transistor M1 in the switching circuit 14. The low-side gate drive signal (LSGD) signal generated for the low-side transistor M2 is similarly illustrated. The graph further illustrates the output voltage—denoted as "$V_C$" in association with the output capacitor C of FIG. 1—as driving the DCM/CCM transitions.

More particularly, in the zoomed waveform view provided by FIG. 7, one sees that the SMPS circuit 10 generates HSGD/LSGD signals for a period of time to bring $V_C$ below the output voltage limit, which is labeled as a "SMART POWER SAVE THRESHOLD," and then suspends switching—i.e., returns to DCM operation until $V_C$ once again rises to the threshold. Such cycling between CCM and DCM operation during zero or negative load conditions represents a "smart" form of power savings in that it allows the SMPS circuit 10 to suspend its switching operations to save power, but allows the SMPS circuit 10 to resume switching as needed to prevent output over-voltage conditions that might otherwise arise.

Figure 7:
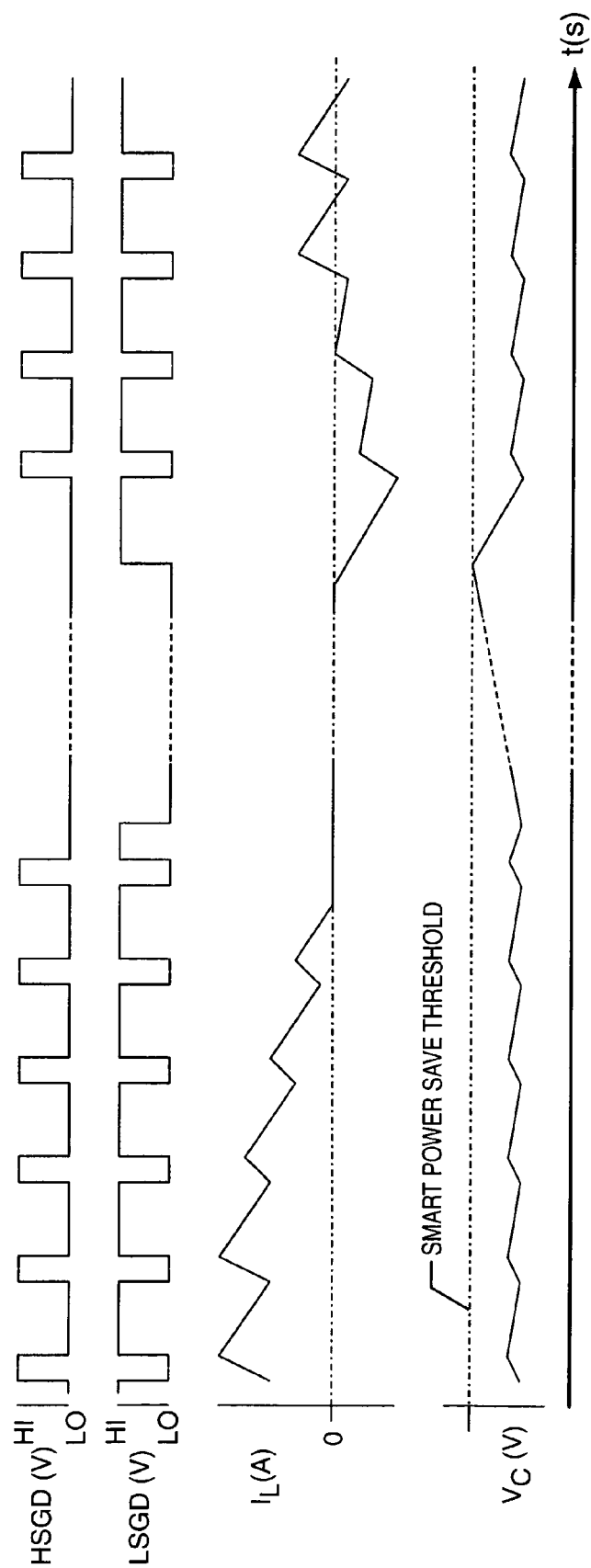
Figure 8:
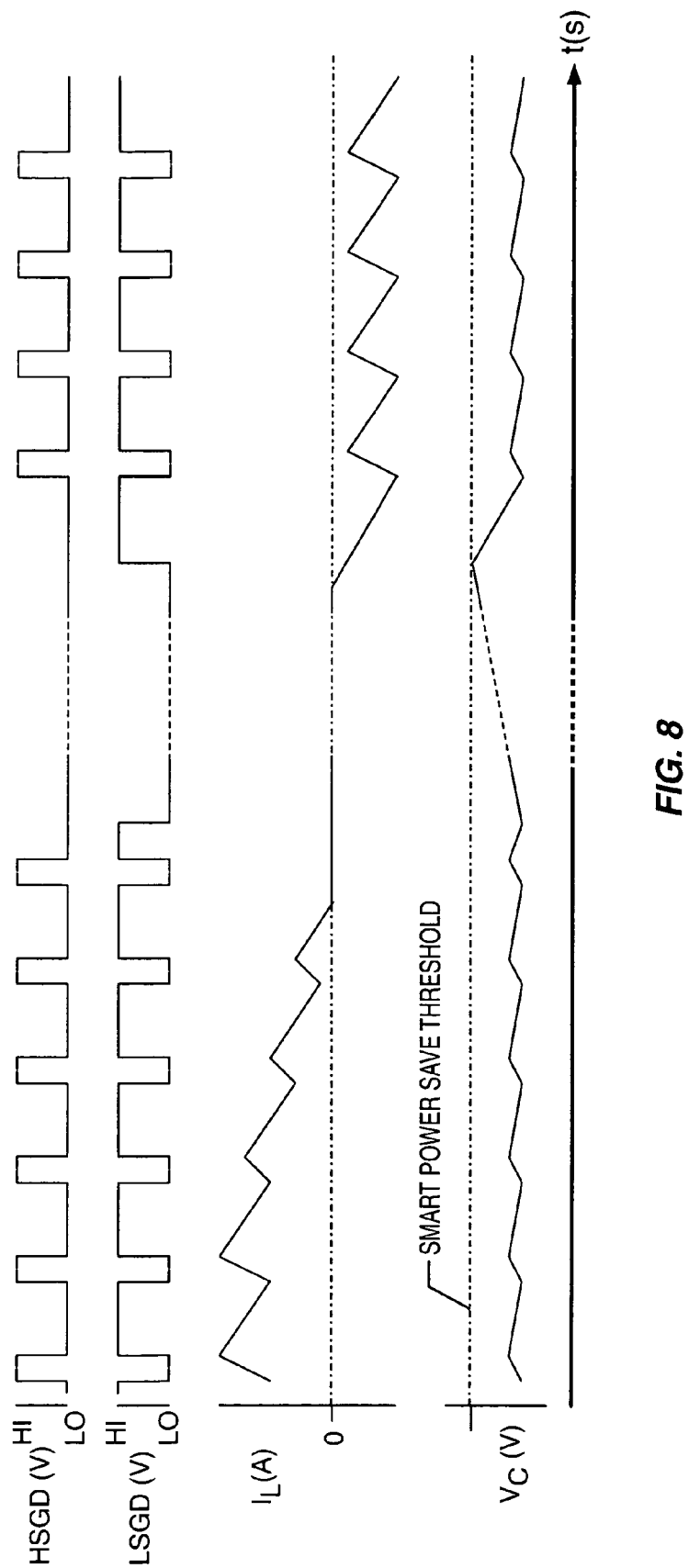

The DCM-to-CCM-to-DCM cycle illustrated in FIGS. 6 and 7 will repeat with a frequency that is dependent on $I_L$ (t). If $I_L$ (t) is negative and does not cross zero current, the SMPS circuit 10 remains in CCM as shown in FIG. 8. The magnitude of output voltage ripple is given as $$\Delta V_{OUT} = V_{CCM} - V_{REF} \qquad \text{Eq. (1)}$$

where $V_{CCM}$ is the operating target voltage to which the SMPS circuit 10 regulates during CCM operation, and $V_{REF}$ is the CCM-to-DCM control threshold reference voltage, or scaled version thereof, at which the SMPS circuit 10 is configured to revert to CCM operation. With Eq. (1), the output ripple frequency is $$f_{\Delta V_{OUT}} = \frac{I_L}{C}(V_{CCM} - V_{REF}) \qquad \text{Eq. (2)}$$

From Eq. (2), one sees that the value of $V_{CCM}$ can be adjusted to produce an acceptable $\Delta V_{OUT}$ based on a specific application.

With the above details and examples in mind, those skilled in the art will appreciate that the disclosed SMPS circuit 10 overcomes the limitations of traditional SMPS circuits offering DCM operation by providing a control mechanism to deal with negative load currents. Broadly, the SMPS circuit 10 embodies a method and apparatus designed to provide low-to-moderate output voltage ripple and fault-free operation while maintaining efficiency benefits of DCM operation at light load currents.

Of course, the present invention is not limited to the above features and advantages. Indeed, those skilled in the art will recognize additional features and advantages upon reading the following detailed description, and upon viewing the accompanying drawings.

What is claimed is:

1. A switched mode power supply circuit comprising:
   a regulation circuit configured to operate selectively in a discontinuous conduction mode (DCM) wherein the regulation circuit stops cycling high-side and low-side switches in a switched output of the regulation circuit, such that the high-side and low-side switches are off and the switched output floats, and in a continuous conduction mode (CCM) wherein the regulation circuit cyclically switches the high-side and low-side switches on and off; and
   a control circuit configured to monitor an output voltage of the switched mode supply circuit during DCM operation of the regulation circuit and temporarily revert the regulation circuit to CCM operation responsive to the output voltage reaching a defined over-voltage limit by being configured to:
      temporarily reactivate the regulation circuit such that it performs one or more cycles of on/off switching of the high-side and low-side switches to relieve the over-voltage condition;
      detect that that inductor current in a switching circuit inductor transitions from positive load current to zero or negative load current, said switching circuit inductor being associated with generating the output voltage via switching by the regulation circuit; and
      responsive to said detecting, deactivate the regulation circuit such that it returns to DCM operation.

2. The switched mode power supply circuit of claim 1, wherein the control circuit comprises a voltage monitoring circuit to monitor the output voltage, a current monitoring circuit to monitor the inductor current, and wherein the control circuit reverts the regulation circuit to CCM operation responsive to the voltage monitoring circuit and returns the regulation circuit to DCM operation responsive to the current monitoring circuit.

3. The switched mode supply circuit of claim 2, wherein the current monitoring circuit comprises a zero crossing detection circuit that is configured to detect zero crossings of the inductor current.

4. The switched mode power supply circuit of claim 1, wherein a first voltage threshold defines the defined over-voltage limit, and wherein the control circuit is further configured to generate a fault signal or initiate a shut-down of the switched mode power supply circuit responsive to detecting that the output voltage reaches a second voltage threshold that is higher than the first voltage threshold.

5. A method of controlling a switched mode power supply circuit that selectively operates in a continuous conduction mode (CCM) wherein a regulation circuit of the switched mode power supply circuit cyclically switches high-side and low-side switches of a switched output on and off to regulate an output voltage of the switched mode power supply circuit and a discontinuous conduction mode (DCM) wherein the regulation circuit stops cycling the high-side and low-side switches, such that the high-side and low-side switches are off and the switched output floats, the method comprising:
   detecting an output over-voltage condition during DCM operation of the switched mode power supply circuit; and
   temporarily reverting the switched mode power supply circuit to CCM operation responsive to detecting the output over-voltage condition by:
      temporarily reactivating the regulation circuit such that it performs one or more cycles of on/off switching of the high-side and low-side switches to relieve the output over-voltage condition;
      detecting that inductor current in a switching circuit inductor transitions from positive load current to zero or negative load current, said switching circuit inductor being associated with generating the output voltage via switching by the regulation circuit; and
      responsive to said detecting, deactivating the regulation circuit such that it returns to DCM operation.

6. The method of claim 5, wherein detecting an output over-voltage condition during DCM operation of the switched mode power supply circuit comprises using a monitoring circuit to monitor the output voltage relative to one or more voltage thresholds.

7. The method of claim 5, wherein detecting an output over-voltage condition during DCM operation of the switched mode power supply circuit comprises detecting that the output voltage is at or above a first voltage threshold, the method further comprising generating a fault signal or initiating shut-down of the switched mode power supply responsive to detecting that the output voltage is at or above a second voltage threshold that is above the first voltage threshold.

8. The method of claim 7, further comprising latching the fault signal.

* * * * *